No. 796,886. PATENTED AUG. 8, 1905.
C. O. WOOD.
FRICTION CLUTCH.
APPLICATION FILED SEPT. 26, 1904.

Witnesses:
Jas. E. Hutchinson.
J. L. Lawlor.

Inventor:
Charles O. Wood,
by Prindle and Williamson
his Attorneys.

UNITED STATES PATENT OFFICE.

CHARLES O. WOOD, OF CHAMBERSBURG, PENNSYLVANIA.

FRICTION-CLUTCH.

No. 796,886.        Specification of Letters Patent.        Patented Aug. 8, 1905.

Application filed September 26, 1904. Serial No. 226,016.

*To all whom it may concern:*

Be it known that I, CHARLES O. WOOD, of Chambersburg, in the county of Franklin, and in the State of Pennsylvania, have invented a certain new and useful Improvement in Friction-Clutches; and I do hereby declare that the following is a full, clear, and exact description thereof, reference being had to the accompanying drawings, in which—

Figure 1:
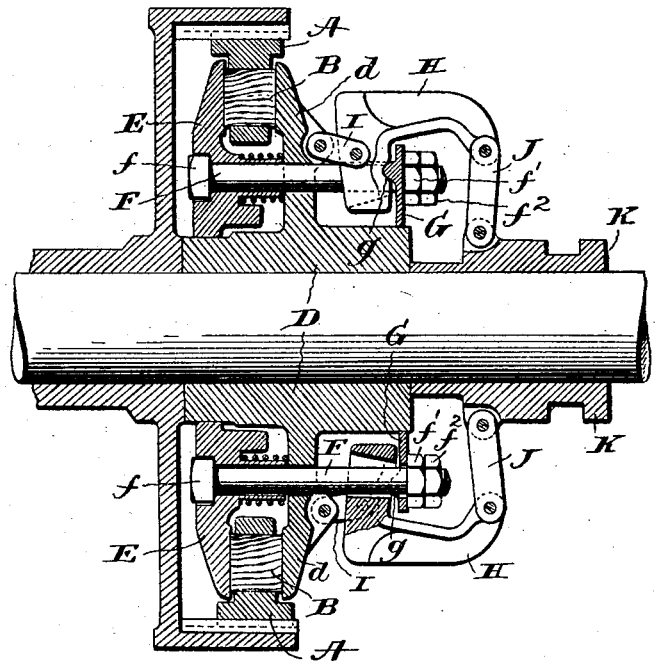
Figure 2:
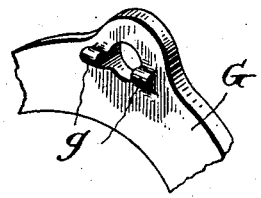

Figure 1 is a longitudinal section of a friction-clutch embodying this invention, and Fig. 2 is a detail view in perspective of a portion of the fulcrum and bracing-ring.

This invention relates to that class of clutches comprising rings or disks provided with blocks of wood that protrude on opposite sides thereof and disks or rings that engage the opposite protruding ends of the blocks of wood; and the object of the invention is to provide a simpler and more efficient clutch of this type; and to this end said invention consists in the clutch having the features of construction substantially as hereinafter specified and claimed.

This clutch is adapted for use either as a shaft-coupling or as a pulley-clutch, and it comprises the friction-ring A, having in holes at suitable intervals apart the circular series of wooden blocks B, that protrude on opposite sides of the ring, the latter being attached to the inner periphery $f$ of a rim or flange C, connected with the pulley, if the clutch be a pulley-clutch, or to a hub on a shaft-section, if the clutch be a shaft-coupling. The ring A is slidable axially, as is common in this class of clutch, it being connected by feathers or splines to the rim C, so that it may thus slide and yet rotate with the rim.

Keyed upon the shaft, which is the same one on which the pulley is mounted, if the clutch be a pulley-clutch, or upon an alining shaft-section, if it be a shaft-coupling, is a hub or sleeve D, having an annular flange $d$, which overlaps and is adapted to engage the blocks B at one end, and for engaging the opposite ends of the blocks is a ring E, that encircles and is axially slidable upon the hub or sleeve D. A series of rods or bolts F pass through the flange $d$ and the ring E and through a second ring G, also axially slidable on the hub or sleeve D and having heads $f$, that engage the ring E, and nuts $f'$, that engage the ring G, so that when power is applied to the latter to move it axially in a direction away from the ring E the latter, through the nuts, bolts, and bolt-heads, will be moved axially and caused to bear upon the blocks B. In addition to the nuts $f'$ there are nuts $f^2$ on the bolts to lock the nuts $f'$ in place. A coiled spring around each bolt F, between the flange $d$ and the ring E, acts to move the latter away from the blocks B when the spring is free to act.

For moving the ring G to cause the ring E to bear upon the blocks B a number of similar toggle mechanisms are employed, preferably one for each bolt F, each of which mechanisms comprises a lever H, that straddles the bolt, the lever being perforated for the passage of the bolt and bears upon a fulcrum lug or rib $g$ on the ring G, and a link or links I, that are pivoted to the lever and to lugs on the side of the flange $d$. A link or links J connect each lever H with a sliding spool or collar K on the shaft, having, as usual, lever-actuated means to move it along the shaft and thereby rock the levers H, and thus apply the ring E to or permit its release from the blocks B.

When the sliding collar K is moved toward the hub D, the links J act to rock the levers H outward and the latter press the ring G in the direction to draw on the bolts F and press the ring E against the blocks B, a toggle action being produced by means of both sets of links J and I, so that a powerful gripping action of the clutch is produced and the parts are securely locked in the clutched condition. The limit of movement of the parts in a clutching operation is secured by having the collar K abut against the end of the hub D.

As the bolts F pass through the ring G they are firmly held by the latter from displacement laterally, either by the action of centrifugal force or the action of the toggle mechanism, and in order to prevent any independent rotative movement of the ring E and the flange $d$ one or the other may be given an extended bearing upon the bolts F by tubular extensions, so that the bolts would thus serve to compel the two to rotate in unison together, or, if desired, the plate E may be made to interlock with the flange $d$.

While the particular details of construction shown in the drawings are well suited to carry the invention into practice, it is to be understood that changes may be made which will involve no departure from the principle or the spirit of the invention.

Having thus described my invention, what I claim is—

1. In a friction-clutch, the combination of a friction-ring, parts to engage the same on opposite sides, bolts passing through said parts, a ring supported by one of the engaging parts, through which the bolts also pass, a bearing provided on said ring and a lever engaging said bearing adapted to transmit power to one of said parts through the bolts.

2. In a friction-clutch, the combination of a friction-ring, parts to engage the same on opposite sides, consisting of a flange and an axially-slidable ring, bolts passing through said ring and flange and engaging the ring, a second ring through which the bolts pass, a support for said second ring, bearings provided on said second ring and operating mechanism comprising one or more levers engaging said bearings, linkage connecting said lever or levers and said flange, and lever-operating means 3. In a friction-clutch, the combination of a friction-ring, parts to engage the same on opposite sides, consisting of a hub or sleeve having a flange and an axially-slidable ring, bolts passing through said ring and flange and engaging the ring, a second ring through which the bolts pass, mounted directly on said hub bearings provided on said second ring, an operating mechanism comprising one or more levers engaging said bearings, linkage connecting said lever or levers and said flange, and lever-operating means.

In testimony that I claim the foregoing I have hereunto set my hand.

CHARLES O. WOOD.

Witnesses:
J. H. EDMONDS,
J. D. ETCHBERGER.